United States Patent [19]

Aharoni

[11] 4,366,273

[45] Dec. 28, 1982

[54] POLYESTER COMPOSITION WITH MIXED METAL ION NUCLEATING AGENTS

[75] Inventor: Shaul M. Aharoni, Morris Plains, N.J.

[73] Assignee: Allied Corporation, Morris Township, Morris County, N.J.

[21] Appl. No.: 262,236

[22] Filed: May 11, 1981

[51] Int. Cl.³ .......................... C08J 3/18; C08L 67/02
[52] U.S. Cl. .................................. 523/400; 524/292; 524/293; 524/315; 524/513; 524/601; 525/176; 525/919
[58] Field of Search ............. 260/22 CB, 22 D, 40 R; 525/176, 919; 524/601, 513, 293, 315, 292; 523/400

[56] References Cited

U.S. PATENT DOCUMENTS

| | | | |
|---|---|---|---|
| 3,435,093 | 3/1969 | Cope | 260/40 R |
| 3,516,957 | 6/1970 | Gray et al. | 260/40 R |
| 3,562,200 | 2/1971 | Jones et al. | 525/176 |
| 3,580,965 | 5/1971 | Brinkmann et al. | 525/176 |
| 3,591,659 | 7/1971 | Brinkmann et al. | 525/176 |
| 3,639,527 | 2/1972 | Brinkmann et al. | 525/919 |
| 4,172,824 | 10/1979 | Harrington et al. | 524/601 |
| 4,195,000 | 3/1980 | Charles et al. | 260/22 D |
| 4,212,791 | 7/1980 | Avery et al. | 525/4 |
| 4,246,378 | 1/1981 | Kometani et al. | 525/4 |
| 4,276,208 | 6/1981 | Ogawa et al. | 260/22 A |
| 4,294,938 | 10/1981 | Berr et al. | 525/176 |
| 4,327,007 | 4/1982 | Vanderkool et al. | 524/315 |

FOREIGN PATENT DOCUMENTS

| | | | |
|---|---|---|---|
| 2856270 | 7/1979 | Fed. Rep. of Germany | 525/176 |
| 7901609 | 8/1979 | Netherlands | 260/31.8 XA |

*Primary Examiner*—Ronald W. Griffin
*Attorney, Agent, or Firm*—Richard A. Negin

[57] ABSTRACT

This invention relates to a composition comprising a linear, saturated polyester, such as poly(ethylene terephthalate), containing between about 4% and about 10% by weight of the poly(ethylene terephthalate) of a hydrocarbon carboxylic acid and/or an organic polymer containing pendant acid carboxyl groups, where the acid groups are neutralized by a first cation selected from Group IA of the Periodic Table of Elements and a second cation selected from Groups IIIA, IIIB and IVB. The first cation is present in an amount less than 50% of the total metal ions and neutralizes not more than 20% of the hydrocarbon acid groups or carboxylic acid groups of the organic polymer. The second cation neutralizes up to 100% of the remaining hydrocarbon acid or carboxyl acid groups. Preferably, the first cation is sodium and the second cation is aluminum. The composition can contain up to about 150% filler and a suitable plasticizer.

37 Claims, No Drawings

POLYESTER COMPOSITION WITH MIXED METAL ION NUCLEATING AGENTS

DESCRIPTION

BACKGROUND OF THE INVENTION

1. Field of Invention

This invention relates to linear, saturated polyester compositions containing nucleating agents made from hydrocarbon acids or organic polymers containing acid groups neutralized by a mixture of metal cations.

2. Description of the Prior Art

It is known to use nucleating agents in crystallizable polymers such as linear saturated polyesters of aromatic dicarboxylic acids. U.S. Pat. Nos. 3,435,093, 3,516,957 and 3,639,527, as well as Dutch Pat. Nos. NL 79-01605, and NL 79-01609, disclose various approaches to molding thermoplastic compositions of linear saturated polyesters of aromatic dicarboxylic acids, and are particularly applicable to poly(ethylene terephthalate). These patents generally disclose the use of salts of hydrocarbon and polymeric carboxylic acids as nucleating agents for linear saturated polyesters.

A molding formulation based on a linear saturated polyester such as poly(ethylene terephthalate) should result in molded product having good physical properties including flexural strength, modulus, tensile strength and impact properties. Further, the molding compound should also have good molding properties including a high melt flow index for sufficient flow into the mold, good mold release properties and good finished appearance.

From a practical point of view, it is desirable that satisfactory properties as outlined above be attained using water heated molds. These molds are heated to temperatures between about 77° C. (170° F.) to about 100° C. (212° F.). In order to accomplish this it is desirable for crystallization to begin at as high a temperature as possible upon the cooling of the polyester which was fed into the mold. A molded article of a more crystalline material has better physical properties, mold release and molded appearance. $T_{cc}$ is used as a measurement to determine the temperature at which crystals first appear upon cooling from the melt. $T_{cc}$ can be measured using a Differential Scanning Calorimeter by the procedure detailed below.

SUMMARY OF THE INVENTION

This invention relates to a composition comprising a linear, saturated polyester, such as poly(ethylene terephthalate), containing from about 4% to about 10% based on the weight of the poly(ethylene terephthalate) of a nucleating agent comprising the salt of a hydrocarbon acid and/or an organic polymer containing pendant acid groups. The acid groups are neutralized by a first cation selected from Group IA of the Periodic Table of Elements, and a second cation of a metal selected from Groups IIIA, IIIB, IVB and copper. The first cation is present in an amount less than 50%, and preferably from 10% to 40%, of the total metal ions and neutralizes not more than 20%, and preferably neutralizes from 5% to 20%, of the hydrocarbon carboxylic acid and/or pendant acid groups of the organic polymer. The second cation neutralizes up to 100%, and preferably from 10% to 60% of the remaining hydrocarbon acid or carboxyl acid groups. Preferably, the composition of the present invention contains from 2% to 10% of a plasticizer, and from 2% to 6% of an impact modifier.

The composition can be filled with up to about 150% filler, and preferably 30% to 90%, based on the weight of the poly(ethylene terephthalate).

In a preferred embodiment, the first cation is selected from the group consisting of potassium and sodium, and the second cation is aluminum.

The present invention relates to a polyester, such as a poly(ethylene terephthalate), molding composition which can be molded in molds heated by water to relatively low temperatures. To accomplish this the crystallization must begin at as high a temperature (Tcc) as possible. The composition of the present invention accomplishes this by using a first cation such as sodium at levels too low to cause measurable crystallization to begin at a high enough temperature. A second cation such as aluminum which cannot be used to cause measurable crystallization to begin at a high enough temperature at any concentration is combined with a low concentration of the first cation. This combination results in a composition in which measurable crystallization begins at a higher temperature than by the use of higher concentrations of the second cation alone, and results in a composition which can be molded in a water heated mold.

Objects, features and advantages of the present invention will become apparent by reference to the following specification.

DESCRIPTION OF THE PREFERRED EMBODIMENTS

This invention relates to a composition comprising a mixture of a linear saturated polyester, preferably poly(ethylene terephthalate), and from about 4% to about 10% based on the weight of the poly(ethylene terephthalate) of a nucleating agent comprising the salt of a hydrocarbon acid and/or an organic polymer containing pendant acid groups, preferably carboxylic acid groups. The carboxylic acid groups on the hydrocarbon acid or the organic polymer are neutralized by a first cation selected from Group IA of the Periodic Table of Elements, and a second cation of metal selected from Groups IIIA, IIIB, IVB and copper. The first cation is present in an amount less than 50%, and preferably from 10% to 40%, of the total metal cations, and does not neutralize more than 20%, and preferably neutralizes 5% to 20%, of the carboxyl groups of the hydrocarbon acid or the pendant carboxyl groups of the organic polymer. The second cation can neutralize up to 100%, and preferably 10% to 60%, of the remaining hydrocarbon acid groups. Preferably, the composition contains a plasticizer and an impact modifier. The composition can contain a filler such as fiberglass. There can be up to about 150% filler, and preferably 30% to 90% filler based on the weight of the polyethylene terephthalate. The preferred filler is fiberglass in the range of from 30% to 90% by weight based on the poly(ethylene terephthalate).

The composition of the present invention includes linear saturated polyesters of aromatic dicarboxylic acids. The preferred linear unsaturated polyesters include poly(ethylene terephthalate), poly(butylene terephthalate), and poly(1,4-cyclohexane dimethylene terephthalate), with poly(ethylene terephthalate) being most preferred. The poly(ethylene terephthalate) for use with the present invention has an intrinsic viscosity range between about 0.4 and about 1.00, with a preferred intrinsic viscosity range between about 0.45 and 0.6. Intrinsic viscosity is obtained by extrapolation of viscosity values to zero concentration of solutions of poly(ethylene terephthalate) in a 60 to 40 weight-/volume ratio of phenol and tetrachloroethane. The measurements are normalized to 25° C. The poly(ethylene terephthalate) can contain minor amounts, up to 5 percent, of other comonomers such as 1,4-cyclohexanyldimethyldiol, butyldiol, neopentyldiol, diethylene glycol or glutaric acid.

The hydrocarbon carboxylic acids can be any hydrocarbon carboxylic acid having up to about 25 carbon atoms per carboxy residue. These acids can be monocarboxylic or polycarboxylic acids. The hydrocarbon carboxylic acid preferably has between about 9 to about 25 carbon atoms. Representative acids include: pelagonic, palmitic, stearic, behenic, sebacic and azelaic acids. Preferred hydrocarbon carboxylic acids are stearic acid, and dimerized or trimerized fatty acids, or mixtures thereof.

The organic polymer containing pendant acid groups includes copolymers of an alpha-olefin having the general formula $RCH=CH_2$ where R is a radical selected from the class consisting of hydrogen and alkyl radicals having from 1 to 8 carbon atoms, and an alpha-beta-ethylenically unsaturated carboxylic acid having 1 or 2 carboxylic acid groups. The acid monomer content of the copolymers is from 0.2 mol percent to 25 mol percent, and preferably 3 mol percent to 10 mol percent based on the copolymer. The olefin content of the copolymer is at least 75 mol percent based on the polymer. Preferred copolymers are copolymers of ethylene and acrylic acid, and copolymers of ethylene and methacrylic acid. Other polymer acids which can be used include homopolymers containing carboxyl groups as well as homopolymers or copolymers containing carboxyl groups or other acid groups such as sulfonic or phosphoric acid groups. Other examples of polymers containing acid groups include poly(styrene maleic anhydride), which is partially or totally hydrolyzed, and polyacrylamide containing carboxylic acid groups.

The hydrocarbon carboxylic acid or organic polymer containing acid groups are neutralized by two cations with the first cation selected from the cations of metals from Group IA of the Periodic Table, and the second cation selected from cations of metals from Groups IIIA, IIIB, IVB and copper. Preferably the first cation is potassium or sodium, with the most preferred first cation being sodium. The second cation is preferably aluminum, copper, or lanthanum, with the most preferred being aluminum. The first cation is present in an amount less than 50%, and preferably from 10% to 40%, of the total metal ions and neutralizes not more than 20%, and preferably neutralizes from 5% to 20%, of the acid groups on the hydrocarbon acid or the organic polymer. The second cation neutralizes up to 100%, and preferably at least 10%, of the remaining hydrocarbon acid groups, and more preferably from 10% to 60% of the remaining acid groups. It is not necessary to neutralize all of the carboxyl groups on the hydrocarbon acid or organic polymer.

The cation is supplied by cation containing materials which are weak acids, such as carbonates, bicarbonates, hydroxides, alkyloxides and acetates. Preferred sodium containing materials are carbonates, bicarbonates and hydroxides. Preferred aluminum containing materials used for neutralization in a solvent or extruder are alkyloxides, such as aluminum isopropoxide. Where the neutralization takes place without a solvent such as in an extruder other aluminum containing materials can be used, such as aluminum hydroxide and aluminum acetate.

The neutralized hydrocarbon carboxylic acid or the neutralized copolymer containing pendant acid groups, preferably pendant carboxyl groups are considered to be nucleating agent of the composition of the present invention. From about 4% to about 10% by weight of the poly(ethylene terephathalate) of the total nucleating agent is used in the composition. The preferred range is from about 4% to about 6% based on the weight of polyethylene terephthalate. The nucleating agent can be from about 4% to about 6% based on the weight of the poly(ethylene terephthalate) of a mixture of the neutralized hydrocarbon carboxylic acid and the neutralized copolymer acid. At least 4% of the nucleating agent is needed for crystallization to begin in the composition at a high enough temperature upon cooling from the melt, to be molded in water cooled molds. The temperature at which crystal formation is first measurable is $T_{cc}$. $T_{cc}$ is measured by weighing about 7 milligrams of the sample. The sample is placed in a Differential Scanning Calorimeter and heated for 10° C./min. from room temperature to 300° C. It is held at 300° C. for 5 minutes. The sample is then cooled at 10° C./min. The $T_{cc}$ appears as a sharp peak on the cooling branch of the curve.

The $T_{cc}$ for pure poly(ethylene terephthalate) having an intrinsic viscosity normalized to 0.56 is approximately 190° C. It is desirable for crystallization from the melt to begin at as high a temperature as possible without adversely affecting the properties of the molded composition. Preferably, there is sufficient nucleating agent for the composition to have a Tcc of at least about 210° C. at an intrinsic viscosity of 0.56.

As noted above the first cation is preferably potassium or sodium, and the second cation is preferably aluminum, copper or lanthanum. It has been found that the second cations of Group IV metals result in nucleating agent which are only marginal in their performance.

Any suitable filler can be used. The fillers may optionally be treated with various coupling agents or adhesion promotors as is known to those skilled in the art. Such fillers may be selected from a wide variety of minerals, metals, metal oxides, siliceous materials, metal salts, and materials thereof. Examples of fillers include glass fibers, alumina, feldspar, asbestos, talc, calcium carbonates, clay, carbon black, quartz, novaculite and other forms of silica, kaolinite, bentonite, garnet, mica, saponite, beidellite, etc. The foregoing recited fillers are illustrative only and are not meant to limit the scope of the fillers that can be utilized in this invention. There is up to 150% by weight of the poly(ethylene terephthalate) of filler, and preferably about 30% to about 90% by weight of the poly(ethylene terephthalate) of filler. The most preferred fillers are glass fibers.

It is very desirable to use a plasticizer in the composition of the present invention. The plasticizer allows crystallization to amorphous areas of the poly(ethylene terephthalate) to continue at lower temperatures than if a plasticizer is not used. This is particularly important in low temperature molding where the mold temperature is below the temperature at which crystallization is expected to stop. This temperature for pure poly(ethylene terephalate) is about 125° C. (257° F.). It has been found in copending application Ser. No. 219,088, Polyethylene Terephthalate Composition Containing Aliphatic Plasticizer and Nucleating Agent, filed Dec. 22, 1980, now U.S. Pat. No. 4,327,007, issued Apr. 27, 1982 that about 4% of dioctyl adipate plasticizer can reduce the temperature at which an amorphous piece of poly(ethylene terephthalate), having an intrinsic viscosity of 0.6, can crystallize to as low as 102° C.

The plasticizers which can be used with the composition of the present invention are of the type known in the art which can be used with linear saturated polyester molding compositions preferably poly(ethylene terephthalate). A nonlimiting group of plasticizers are the following organic esters. The organic esters can be the product of an aromatic carboxylic acid of 7-11 carbon atoms containing at least one carboxyl group per aromatic nucleus, and an alcohol selected from those of the formula (HOCH)$_2$R'$_x$ wherein x is 1, 2 or 3 and R' is a hydrocarbon radical of 2-15 carbon atoms (preferably 2-10 carbon atoms) or those of the formula HO(R"O)$_y$R''' wherein y is a cardinal number between 1 and 8, R" is a hydrocarbon radical of 2-15 carbon atoms (preferably 2-8 carbon atoms) and R''' is —H or a hydrocarbon radical of 2-20 carbon atoms (preferably 2-12 carbon atoms). The plasticizer disclosed can also be the product of an aliphatic carboxylic acid of 1 to 20 carbon atoms containing 1-3 carboxyl groups, and an alcohol of the formula HO(R"O)$_y$R''', wherein R", R''' and y are defined above. Further the plasticizer as disclosed includes the following: organic ketones of the formula

organic sulfones of the formula RSOOR; organic sulfoxides of the formula R$_2$SO; organic nitriles of the formula RCN; and organic amides of the formula

wherein R is a hydrocarbon radical group of 1-25 carbons, and R' is a hydrogen or hydrocarbon radical group of 1-25 carbon atoms. A preferred aliphatic plasticizer is dioctyl adipate, and a preferred aromatic plasticizer is neopentyl glycol dibenzoate. Other aromatic plasticizers which can be used include: triethylene glycol dibenzoate, glyceryl tribenzoate, trimethylolethane tribenzoate, and pentaerythretol tetrabenzoate. In the present invention up to about 15% by weight of the polyester of plasticizer can be used. Preferably, there is between about 2% and 10% based on the weight of the poly(ethylene terephthalate) of plasticizer, and most preferably there is between about 2% and about 6% based on the weight of the poly(ethylene terephthalate) of plasticizer.

Copolymers of ethylene and carboxylic acids or their esters can be used as impact modifiers. Included in these impact modifiers are the following copolymers: ethylene acrylic acid, methylene methacrylic acid, ethylene ethyl acrylate, and ethylene vinyl acetate. There can be up to about 10% based on the weight, and preferably from about 2% and about 6% based on the weight of the poly(ethylene terephthalate) of the impact modifier.

The composition can contain a polyepoxide. The epoxy resins which can be used include an epoxy formed from bisphenol-A and glycidyl ether, or polyepoxides obtained by reacting orthocresol novolac and epichlorolydrin. Preferred polyepoxides are epoxy cresol novalac resins ECN 1235, 1273 and 1299 produced by the Ciba-Geigy Corporation. Preferably, there is up to about 3% and more preferably 0.1% to about 0.5% based on the weight of the polyethylene terephthalate of polyepoxide. The polyepoxides act as chain extenders and help to compensate for poly(ethylene terephthalate) chains broken by hydrolysis.

In addition to the components discussed above, the compositions of the present invention can contain additives commonly employed with polyester resins, such as colorants, mold release agents, antioxidants, ultra-violet light stabilizers and the like.

A preferred filled composition comprises poly(ethylene terephthalate), from about 30% to about 60% glass fibers, and from about 4% to about 8% of a salt hydrocarbon carboxyl acid or an organic copolymer containing pendant carboxyl groups where the carboxyl groups are neutralized by sodium and aluminum. The sodium ions are from 10% to 40% of the metal ions, and neutralize from 5% to 20% of the carboxyl groups. The aluminum is present in amount sufficient to neutralize from 10% to 60% of the remaining carboxyl groups. There can be from 3% to 6% of a plasticizer such as neopentyl glycol dibenzoate, from 2% to 4% of ethylene acrylic acid copolymer, and from 0.1 to 0.5% polyepoxide. The percents are based on the weight of poly(ethylene terephthalate).

The first and second cations are used to neutralize the hydrocarbon acid and/or organic acid pendant carboxyl groups. The neutralization may take place in any suitable manner known in the art. The relative amounts of first and second cation neutralized acid groups can be prepared in the proper proportions in any one of several methods. In one method the hydrocarbon acid or polymer acid group is combined with the proper stoichiometric amounts of first cations and second cations to result in the desired neutralization of carboxyl groups. In another method separate batches of hydrocarbon acids or the organic acids are neutralized separately with a single ion. The batches are then mixed together to obtain the desired ratio of ions. In yet another method, a polymer containing pendant carboxyl groups is neutralized in part or full with one ion, either a first or second cation and is combined with a hydrocarbon acid which is neutralized with the corresponding first or second cation and mixed in the desired proportion.

Examples 1-3, which follow, illustrate the preparation of various mixed ion nucleating agents for use in the composition of the present invention.

EXAMPLE 1

This is an example procedure of the preparation of an organic polymer salt nucleating agent for use in the composition of the present invention. Ethylene acrylic acid copolymer (EAA) manufactured by Dow Chemical Corp., as Dow EAA 455 having 8% by weight of acrylic acid was neutralized. The EAA was mixed with the cation containing materials in a 1 inch extruder at about 150° C. The first cation containing material was sodium carbonate and the second cation containing material was aluminum isopropoxide. The neutralized EAA contained about 1% by weight aluminum, and 0.75% by weight of sodium.

EXAMPLE 2

In this Example, separate batches of ethylene acrylic acid copolymer (Dow EAA 455) were neutralized according to the process of Example 1. One batch was neutralized with 2.5 % by weight aluminum, and a second batch was neutralized with 2.3% by weight sodium. The batches were mixed in a 2:1 ratio, 2 parts of the aluminum neutralized copolymer were mixed with each part of sodium neutralized copolymer.

EXAMPLE 3

Example 3 provides a detailed example of a laboratory procedure to prepare an aluminum neutralized carboxylic acid copolymer in solution.

A two liter three-necked flask was equipped with a mechanical stirrer, dropping funnel and drying tube. There was dissolved with constant stirring at 100° C.–110° C., 100 grams of ethylene acrylic acid copolymer (Dow EAA 455) in 750 ml of xylene and 250 ml of dimethylacetamide. After complete dissolution 4.5 grams of aluminum isopropoxide were added dropwise as a solution in xylene with fast stirring. The reaction went to completion rapidly and the very viscous solution was poured into excess methanol. The mixture was passed through a blender and filtered. The pulverized polymer was washed three times with methanol and once in acetone before drying to constant weight. Aluminum content was found to be 0.60 weight percent.

EXAMPLE 4

In this Example, 10 parts by weight of an aluminum neutralized ethylene acrylic acid (Dow EAA 455) of Example 3 was mixed with one part of sodium stearate.

EXAMPLE 5

Poly(ethylene terephthalate) pellets or chips, having an intrinsic viscosity of about 0.56, were mixed with a nucleating agent in a single screw extruder at from about 550° F. and about 580° F. About 6% based on the weight of the poly(ethylene terephthalate) of aluminum and sodium neutralized ethylene acrylic acid copolymer (Dow EAA 455) made by a method similar to that in Example 1, was used as a nucleating agent. The nucleating agent had 0.15 milliequivalents of aluminum per gram of the copolymer and 0.13 milliequivalents of sodium per gram of the copolymer. The aluminum was present in sufficient amount to neutralize 0.45 milliequivalents of the carboxyl groups per gram of the copolymer, and the sodium was present in sufficient amounts to neutralize about 13 milliequivalents of carboxyl groups per gram of copolymer. Upon cooling the crystallization temperature was measured as $T_{cc}=211°$ C. for a poly(ethylene terephthalate) having an intrinsic viscosity of 0.56. It is noted that the crystallization temperature of poly(ethylene terephthalate) with no nucleating agent is approximately 190° C.

EXAMPLE 6

In this example, 500 grams of poly(ethylene terephthalate) having an intrinsic viscosity of 0.83 was mixed with 10 grams of Du Pont Company's Surlyn ® 1856 (copolymer containing about 0.9 weight percent sodium), and 20 grams of Dow EAA 455, ethylene acrylic acid copolymer neutralized with 0.6 weight percent aluminum made by the method of Example 3. The Surlyn 1856 is a copolymer derived from ethylene and methacrylic acid having a melt index of 1.0. It is described in detail in the bulletin, Surlyn ® Ionomer Resin, E 1488 published by Du Pont. The mixture was passed through a single screw extruder twice at about 550° F. The above recipe results in 0.00018 weight percent sodium and 0.00012 weight percent aluminum. Thermal data showed the system to have a $T_{cc}$ of 209° C.

EXAMPLE 7

The following table illustrates the resulting $T_{cc}$'s obtained for poly(ethylene terephthalate) with no nucleating agent, sodium cations alone, aluminum cations alone, and sodium and aluminum cations together. The cation supplying materials are the sodium and aluminum salts of ethylene acrylic acid copolymer (Dow EAA 455). The salts were made by a method similar to that in Example 2. There was 6% based on the weight of the poly(ethylene terephthalate) of the copolymer salt in comparatives 2–5 and Example 7. This example and comparatives illustrate the improvement in obtaining higher Tcc values when combining sodium and aluminum ions. Each run was repeated several times. The $T_{cc}$ values are ±1° C.

|  | Nucleating Agent | % Carboxyls Neutralized | | $T_{cc}°$ C. |
|---|---|---|---|---|
|  |  | By Al | By Na |  |
| Comp. 1 | None | — | — | 190 |
| Comp. 2 | EAA/Al | 50 | — | 198 |
| Comp. 3 | EAA/Na | — | 10 | 207 |
| Comp. 4 | EAA/Na | — | 20 | 209 |
| Comp. 5 | EAA/Na | — | 30 | 212 |
| Ex. 7 | EAA/(Al + Na) | 35 | 10 | 211 |

EXAMPLE 8

This is an example of a preferred filled composition. The nucleating agent is the same as the nucleating agent of Example 7.

|  | Weight Percent |
|---|---|
| PET | 59.2 |
| Glass Fiber | 30.00 |
| EAA | 2.75 |
| Neopentyl glycol dibenzoate | 4.00 |
| Epoxy | .3 |
| EAA/(Al + Na) | 3.75 |

While exemplary embodiments of the invention have been described, the true scope of the invention is to be determined from the following claims.

What is claimed is:

1. A composition comprising: a linear saturated polyester; and from about 4% to about 10% by weight of the polyester of a nucleating agent comprising a hydrocarbon carboxyl acid neutralized by a first cation selected from metals of Group IA of the Periodic Table of Elements and a second cation selected from metals of Groups IIIA, IIIB, IVB and copper, the first cation being present in an amount less than 50% of the total metal ions and neutralizing not more than 20° C. of the hydrocarbon acid group, and the second cation neutralizing up to 100% of the remaining hydrocarbon acid groups.

2. A composition comprising: a linear saturated polyester and from about 4% to about 10% by weight of the polyester of a nucleating agent comprising an organic polymer containing pendant carboxyl groups, the carboxyl groups being neutralized by a first cation selected from metals of Group IA of the Periodic Table of Elements and a second cation selected from metals of Groups IIIA, IIIB, IVB and copper, the first cation being present in an amount less than 50% of the total metal ions and neutralizing not more than 20% of the carboxyl acid groups, and the second cation neutralizing up to 100% of the remaining carboxyl acid groups.

3. A composition as recited in claim 2 wherein the pendant acid groups of the organic polymer are carboxyl groups, the hydrocarbon acid is selected from the group consisting of stearic acid, dimer acid, trimer acids, and mixtures thereof, and the organic polymer is selected from the group consisting of the copolymer of ethylene and acrylic acid and the copolymer of ethylene and methacrylic acid.

4. The composition as recited in claim 1, 2 or 3 wherein the linear, saturated polyester is poly(ethylene terephthalate).

5. The composition as recited in claim 4 wherein the first cation is selected from the group consisting of potassium and sodium.

6. The composition as recited in claim 5 wherein the first cation is sodium.

7. The composition as recited in claim 6 wherein the second cation is aluminum.

8. The composition as recited in claim 4 wherein the second cation is selected from the group consisting of aluminum, and lanthanum.

9. The composition as recited in claim 8 wherein the second cation is aluminum.

10. The composition as recited in claim 4 wherein there is from 4% to 6% based on the weight of the poly(ethylene terephthalate) of nucleating agent.

11. The composition as recited in claim 4 further comprising up to 150% based on the poly(ethylene terephthalate) of a filler.

12. The composition as recited in claim 11 wherein there is from 30% to 90% filler based on the polyethylene terephthalate.

13. The composition as recited in claim 12 wherein the filler is glass fiber.

14. The composition as recited in claim 4 further comprising up to about 15% based on the weight of the poly(ethylene terephthalate) of plasticizer.

15. The composition as recited in claim 4 further comprising from about 2% to about 10% based on the weight of the poly(ethylene terephthalate) of plasticizer.

16. The composition as recited in claim 15 wherein the plasticizer is selected from the group consisting of: dioctyl adipate, neopentyl glycol dibenzoate, triethylene glycol dibenzoate, trimethylolethane tribenzoate, and pentaerythritol tetrabenzoate.

17. The composition as recited in claim 4 comprising up to 3% based on the poly(ethylene terephthalate) of an epoxy.

18. The composition as recited in claim 4 comprising up to 10% based on the poly(ethylene terephthalate) of an impact modifier.

19. The composition as recited in claim 18 to wherein there is from about 2% to about 6% based on the poly(ethylene terephthalate) of an impact modifier selected from the group consisting of: ethylene acrylic acid copolymer, ethylene methacrylic acid copolymer, ethylene ethyl acrylate, and ethylene vinyl acetate.

20. The composition as recited in claim 4 wherein the first cation is present in an amount of from 10% to 40% of the total metal ions and neutralizes from 5% to 20% of the carboxyl groups, and the second cation neutralizes from 10% to 100% of the remaining carboxyl groups.

21. The composition as recited in claim 20 wherein the second cation neutralizes from 10% to 60% of the remaining carboxyl groups.

22. The composition as recited in claim 4 having sufficient nucleating agent for the composition to have a $T_{cc}$ of at least about 210° C.

23. A composition comprising: poly(ethylene terephthalate); from 4% to about 10% by weight of the poly(ethylene terephthalate) of a mixture of a hydrocarbon acid having carboxyl groups and an organic polymer containing pendant acid groups, the carboxyl groups being neutralized by a first cation selected from Group IA of the Periodic Table of Elements and a second cation selected from Groups IIIA, IIIB AND IVB, the first cation being present in an amount less than 50% of the total metal ions and neutralizing not more than 20% of the hydrocarbon acid groups, and the second cation neutralizing up to 100% of the remaining hydrocarbon acid groups.

24. The composition as recited in claim 23 wherein the pendant acid groups in the organic polymer are carboxyl groups, the hydrocarbon acid is selected from the group consisting of stearic acid, dimer acid, trimer acids, and mixtures thereof, and the organic polymer is selected from the group consisting of the copolymer of ethylene and acrylic acid and the copolymer of ethylene and methacrylic acid.

25. The composition as recited in claim 24 wherein the first cation is selected from the group consisting of potassium and sodium, and the second cation is selected from the group consisting of aluminum and lanthanum.

26. The composition as recited in claim 25 wherein the first cation is sodium and the second cation is aluminum.

27. The composition as recited in claim 25 further comprising up to 3.0% by weight of the poly(ethylene terephthalate) of an epoxy.

28. The composition as recited in claim 25 further comprising between about 40 percent and about 90 percent by weight of the poly(ethylene terephthalate) of filler.

29. The composition as recited in claim 24 wherein there is from 4% to 6% nucleating agent.

30. The composition as recited in claim 24 further comprising up to about 15% based on the weight of the poly(ethylene terephthalate) of plasticizer.

31. The composition as recited in claim 30 further comprising from about 2% to about 10% based on the weight of the poly(ethylene terephthalate) of plasticizer.

32. The composition as recited in claim 31 wherein the plasticizer is selected from the group consisting of: dioctyl adipate, neopentyl glycol dibenzoate, triethylene glycol dibenzoate, trimethylolethane tribenzoate, and pentaerythritol tetrabenzoate.

33. The composition as recited in claim 25 comprising up to 10% based on the poly(ethylene terephthalate) of an impact modifier.

34. The composition as recited in claim 33 wheren there is from about 2% to about 6% of an impact modifier selected from the group consisting of: ethylene acrylic acid copolymer, ethylene methacrylic acid copolymer, ethylene ethyl acrylate, and ethylene vinyl acetate.

35. The composition as recited in claim 25 wherein the first cation is present in an amount of from 10% to 40% of the total metal ions and neutralizes from 5% to 20% of the carboxyl groups, and the second cation neutralizes from 10% to 100% of the remaining carboxyl groups.

36. The composition as recited in claim 35 wherein the second cation neutralizes from 10% to 60% of the remaining carboxyl groups.

37. The composition as recited in claim 25 having sufficient nucleating agent for the composition to have a $T_{cc}$ of at least about 210° C.

* * * * *